US010121057B2

(12) United States Patent
Bradley et al.

(10) Patent No.: US 10,121,057 B2
(45) Date of Patent: *Nov. 6, 2018

(54) ENSURING A DESIRED DISTRIBUTION OF CONTENT IN A MULTIMEDIA DOCUMENT FOR DIFFERENT DEMOGRAPHIC GROUPS UTILIZING DEMOGRAPHIC INFORMATION

(71) Applicant: International Business Machines Corporation, Armonk, NY (US)

(72) Inventors: Lisa M. Bradley, Cary, NC (US); Brian O'Donovan, Dublin (IE); Aaron J. Quirk, Cary, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 563 days.

This patent is subject to a terminal disclaimer.

(21) Appl. No.: 14/821,981

(22) Filed: Aug. 10, 2015

(65) Prior Publication Data

US 2016/0260127 A1   Sep. 8, 2016

Related U.S. Application Data

(63) Continuation of application No. 14/635,854, filed on Mar. 2, 2015.

(51) Int. Cl.
*G06K 9/00* (2006.01)
*G06T 11/60* (2006.01)
(Continued)

(52) U.S. Cl.
CPC ... *G06K 9/00268* (2013.01); *G06F 17/30867* (2013.01); *G06K 9/00281* (2013.01);
(Continued)

(58) Field of Classification Search
CPC .......... G06F 17/30867; G06Q 30/0254; G06T 11/60
See application file for complete search history.

(56) References Cited

U.S. PATENT DOCUMENTS 5,293,475 A   3/1994   Hennigan et al.
5,898,430 A   4/1999   Matsuzawa et al.
(Continued)

FOREIGN PATENT DOCUMENTS

WO   2008141109 A1   11/2008
WO   2009123711 A1   10/2009

OTHER PUBLICATIONS

Tong et al. "Toward Accommodating Gender Differences in Multimedia Communication", Jun. 2004, IEEE transactions on professional communication, vol. 47, No. 2, pp. 118-112.*
(Continued)

*Primary Examiner* — Qian Yang
(74) *Attorney, Agent, or Firm* — Robert A. Voigt, Jr.; Winstead, P.C.

(57) ABSTRACT

A method, system and computer program product for ensuring a desired distribution of images in a multimedia document among different demographic groups. Demographic criteria (e.g., age) is received to form demographic groups of members of an organization. Demographic information along with interests of the members are retrieved. Such member data is analyzed within the constraints of the demographic criteria to generate a statistical distribution of members of the organization that forms an initially desired distribution of content of the multimedia document among the demographic groups of the organization. An indication is then provided to the user regarding whether the current distribution of the content of the multimedia document among the demographic groups of the organization satisfies or does not satisfy the desired distribution of content among
(Continued)

the demographic groups. In this manner, the user can ensure a desired distribution of content in the multimedia document among different demographic groups.

8 Claims, 5 Drawing Sheets

(51) Int. Cl.
*G06Q 30/02* (2012.01)
*G06F 17/30* (2006.01)

(52) U.S. Cl.
CPC ..... *G06K 9/00288* (2013.01); *G06Q 30/0254* (2013.01); *G06T 11/60* (2013.01)

(56) References Cited

U.S. PATENT DOCUMENTS

| | | | |
|---|---|---|---|
| 6,173,068 | B1 | 1/2001 | Prokoski |
| 6,633,655 | B1 | 10/2003 | Hong et al. |
| 7,143,353 | B2 | 11/2006 | McGee et al. |
| 7,873,621 | B1* | 1/2011 | Datar ............... G06Q 30/02 707/706 |
| 8,194,986 | B2 | 6/2012 | Conwell |
| 8,379,937 | B1 | 2/2013 | Moon et al. |
| 8,565,539 | B2 | 10/2013 | Chao et al. |
| 8,644,622 | B2 | 2/2014 | Perronnin et al. |
| 2003/0101164 | A1 | 5/2003 | Pic et al. |
| 2003/0103645 | A1 | 6/2003 | Levy et al. |
| 2003/0105739 | A1 | 6/2003 | Essafi et al. |
| 2004/0062520 | A1 | 4/2004 | Gutta et al. |
| 2004/0169683 | A1 | 9/2004 | Chiu et al. |
| 2006/0251338 | A1 | 11/2006 | Okturk et al. |
| 2008/0304808 | A1 | 12/2008 | Newell et al. |
| 2008/0306826 | A1* | 12/2008 | Kramer ............... G06Q 30/02 705/14.14 |
| 2011/0038550 | A1 | 2/2011 | Obrador |
| 2011/0069085 | A1 | 3/2011 | Weber et al. |
| 2011/0116690 | A1 | 5/2011 | Ross et al. |
| 2012/0328168 | A1 | 12/2012 | Dailey et al. |
| 2013/0050745 | A1 | 2/2013 | Cok et al. |
| 2013/0322707 | A1 | 12/2013 | Phillips et al. |
| 2013/0346412 | A1 | 12/2013 | Raichelgauz et al. |
| 2014/0153832 | A1 | 6/2014 | Kwatra et al. |
| 2016/0086020 | A1* | 3/2016 | Bigos ................. G06F 3/0482 715/703 |
| 2016/0180403 | A1* | 6/2016 | Ganesh ............. G06Q 30/0269 705/14.66 |
| 2017/0109603 | A1* | 4/2017 | Wang ................. G06K 9/4671 |

OTHER PUBLICATIONS

Office Action for U.S. Appl. No. 14/635,942 dated Apr. 22, 2016, pp. 1-36.
Office Action for U.S. Appl. No. 14/822,147 dated Apr. 21, 2016, pp. 1-23.
List of IBM Patents or Patent Applications Treated as Related, Jul. 25, 2016, pp. 1-2.
List of IBM Patents or Patent Applications Treated as Related, Aug. 22, 2016, pp. 1-2.
Office Action for U.S. Appl. No. 15/242,721 dated Nov. 30, 2016, pp. 1-38.
List of IBM Patents or Patent Applications Treated as Related, Aug. 10, 2015, pp. 1-2.
4K Slideshow Maker, "Create Impressive Slideshows, Save Your Memories," http://www.4kdownload.com/products/product-slideshowmaker, 2014, pp. 1-2.
Bahrampour, Tara, "Can Your Face Reveal How Long You'll Live? New Technology may Provide the Answer," http://www.washingtonpost.com/national/health-science/can-your-face-reveal-how-long-youll-live-new-technology-may-provide-the-answer/2014/07/02/640bacb4-f748-11e3-a606-946fd632f9f1_story.html, Jul. 2, 2014, pp. 1-14.
Berkowitz et al., "How Old Does Your Face Look? A New Twist on Longevity," http://www.washingtonpost.com/national/health-science/how-old-does-your-face-look-a-twist-on-longevity/2014/07/02/e6567160-01f5-11e4-8572-4b1b969b6322_graphic.html, Jul. 2, 2014, pp. 1-5.
Office Action for U.S. Appl. No. 14/635,854 dated Mar. 8, 2018, pp. 1-48.
Office Action for U.S. Appl. No. 15/218,496 dated May 9, 2018, pp. 1-44.

* cited by examiner

ENSURING A DESIRED DISTRIBUTION OF CONTENT IN A MULTIMEDIA DOCUMENT FOR DIFFERENT DEMOGRAPHIC GROUPS UTILIZING DEMOGRAPHIC INFORMATION

TECHNICAL FIELD

The present invention relates generally to creating multimedia documents, and more particularly to ensuring a desired distribution of content (e.g., images) in a multimedia document (e.g., yearbook, slideshow, video, website) for different demographic groups (e.g., a group of individuals in their 20s) utilizing demographic information (e.g., age, gender).

BACKGROUND

Generating a multimedia document, such as a yearbook or slideshow, that includes a set of images that is representative of different demographic groups (e.g., a group of individuals in their 20s, a group of individuals in their 30s, etc.) within a large group of members (e.g., employees at a company) can be a difficult task. For example, it takes a lot of effort and time in creating an end of the year slideshow for an organization (e.g., company, non-profit organization) that includes pictures of members of the organization (e.g., employees of company). The creator(s) of the slideshow may want to ensure that each demographic group (e.g., groups based on age, race, gender) are not overly or inadequately represented in comparison to the other demographic groups in order to provide fairness and increase member enjoyment. For example, the creator(s) of the yearbook may want to ensure that the slideshow does not include many images of a particular demographic group (e.g., twenty pictures of males) while only including a single image of another class demographic group (e.g., a single picture of a female). However, the creator(s) of the slideshow may have hundreds or thousands of images of hundreds of members of the organization to choose to include in the slideshow. As a result, it may be overwhelming for the creator(s) of the slideshow to ensure that each member of the organization is adequately represented in the slideshow and that there are not some members that are overly represented in the yearbook.

Currently, a multimedia document, such as a slideshow, may be generated by selecting an image for inclusion in the slideshow, where the image has associated facial detection information. A face location is determined in the selected image based on the facial detection information and the selected image is cropped based on the determined face location to generate a cropped image depicting the included face. The cropped image is inserted into a slide associated with the slideshow. However, there is not currently an approach in ensuring a specific distribution of images in the slideshow for various demographic groups, such as ensuring a particular demographic group is not overly or insufficiently represented in the slideshow.

Furthermore, a multimedia document, such as a yearbook, may be designed and created utilizing a facial recognition module for identifying a subject in a photo and tagging the photo with an identity of the subject. Identifying the subject may include comparing the photo to a plurality of previously tagged photos to identify the subject. However, there is not currently an approach in ensuring a specific distribution of images for demographic groups in the yearbook. For example, there is not currently an approach in ensuring that each demographic group has a minimum number of images in the yearbook. Neither is there currently an approach in ensuring that there is a certain percentage of images out of the total number of images in the yearbook for a particular demographic group.

Therefore, there is a need in the art for ensuring a desired distribution of images for various demographic groups in a multimedia document (e.g., yearbook, slideshow, video, website).

BRIEF SUMMARY

In one embodiment of the present invention, a method for ensuring a desired distribution of images in a multimedia document among different demographic groups comprises receiving demographic criteria to form demographic groups of members of an organization. The method further comprises retrieving demographic information of the members of the organization. The method additionally comprises retrieving interests of the members of the organization. Furthermore, the method comprises analyzing the demographic information and the interests of the members of the organization within constraints of the demographic criteria to generate a statistical distribution of members to form a desired distribution of content of the multimedia document among the demographic groups of the organization. Additionally, the method comprises receiving content of the multimedia document for analysis. In addition, the method comprises analyzing the content of the multimedia document based on the demographic criteria. The method further comprises determining, by a processor, a current distribution of the content of the multimedia document among the demographic groups of the organization based on the analysis. The method additionally comprises providing an indication that the current distribution of the content of the multimedia document among the demographic groups of the organization satisfies or does not satisfy the desired distribution of content among the demographic groups of the organization. In this manner, the user can ensure a desired distribution of content in the multimedia document (e.g., yearbook, slideshow, video, website) among different demographic groups.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
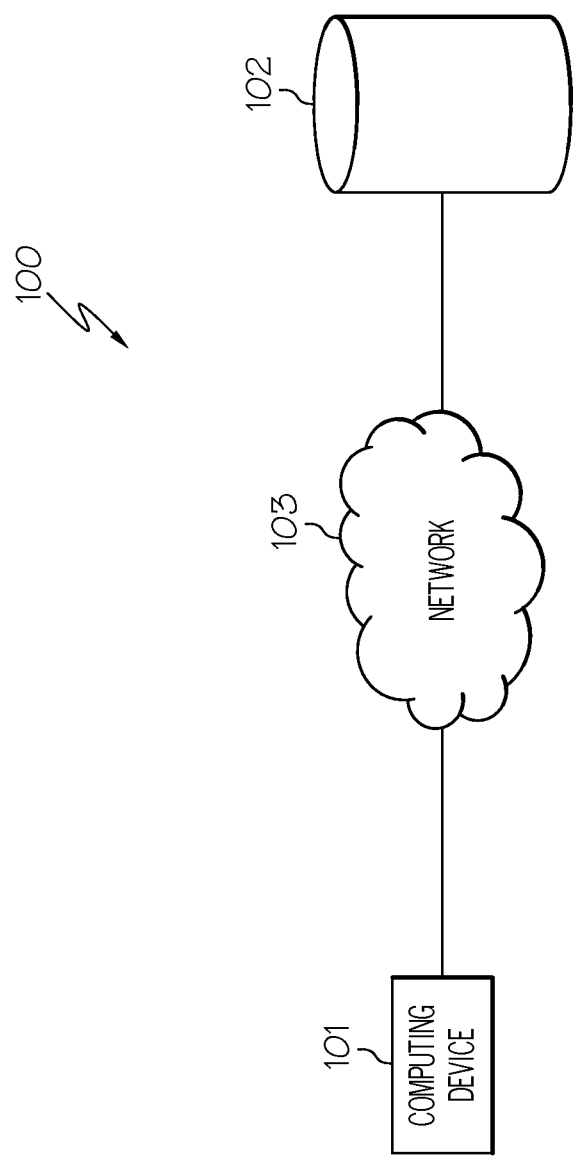
FIG. 1 illustrates a network system configured in accordance with an embodiment of the present invention.

The present invention comprises a method, system and computer program product for ensuring a desired distribution of images in a multimedia document among different demographic groups. In one embodiment of the present invention, demographic criteria (e.g., age, race, gender) is received from a user to form demographic groups of members of an organization (e.g., demographic group of females aged 11-20 years old). Demographic information (e.g., age, gender, race) of members of the organization along with interests of members of the organization are retrieved. Such member data is analyzed within the constraints of the received demographic criteria to generate a statistical distribution of members of the organization that initially forms a desired distribution of content (e.g., images, video, text, voice) of the multimedia document among the demographic groups of the organization. For example, if the demographic criteria received was to form demographic groups based on age, then a statistical distribution of members of the organization based on age may appear as follows: aged 11-20 (5%); aged 21-30 (20%); aged 31-40 (40%); aged 41-50 (20%); aged 51-60 (10%); aged 61 and older (5%), where the percentage indicates a percentage of the members of the organization with an age in that corresponding demographic group. The content of the multimedia document (e.g., yearbook, slideshow, video, website) created by the user is then received for analysis. The content of the multimedia document is analyzed based on the demographic criteria. For example, if the demographic criteria received was to form demographic groups based on gender, then the content (e.g., pictures) of the multimedia document is analyzed for images of individuals based on gender. The current distribution of the content of the multimedia document among the demographic groups of the organization is determined based on this analysis. For example, it may be determined that out of the 1,000 images analyzed, 700 of them were pictures of males and 300 of them were pictures of females. A determination is then made as to whether the current distribution of content among the demographic groups of the organization satisfies the desired distribution of content among the demographic groups. For example, it may be determined that out of the 100 slides of the slideshow, 70 slides depict men and 30 slides depict women. Such a content distribution (70 slides of men and 30 slides) may be compared to the desired distribution of content among the demographic groups of the organization, such as a statistical distribution of members of the organization based on gender: male (65%) and female (35%). In such an example, the current distribution of content among the demographic groups of the organization does not satisfy the desired distribution of content among the demographic groups since 70% of the slides depict men as opposed to 65% and only 30% of the slides depict females as opposed to 35%. An indication may then be provided to the user regarding whether the current distribution of the content of the multimedia document among the demographic groups of the organization satisfies or does not satisfy the desired distribution of content among the demographic groups of the organization. In this manner, the user can ensure a desired distribution of content in the multimedia document (e.g., yearbook, slideshow, video, website) among different demographic groups.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a network system 100 configured in accordance with an embodiment of the present invention. Network system 100 includes a computing device 101 connected to a database 102 via a network 103. Computing device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to database 102 via network 103. A hardware configuration of a computing device 101 is discussed below in connection with FIG. 2.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Database 102 is configured to store demographic information (e.g., age, gender) for members (e.g., employees) of an organization (e.g., non-profit organization, corporation). In one embodiment, database 102 may further be configured to store profiles of the members containing information, such as the employee's interest, skills, roles and family members. In one embodiment, database 102 is configured to store the statistical distribution of members of the organization that corresponds to the desired distribution of content of a multimedia document (e.g., yearbook, slideshow, video, website) among the different demographic groups (e.g., males aged 21-30, males aged 31-40) of the organization as discussed further below in connection with FIGS. 3-4. While FIG. 1 illustrates a single database 102, network system 100 may include any number of databases 102 that may store in combination or separately one or more of the different types of information discussed above.

Figure 2:
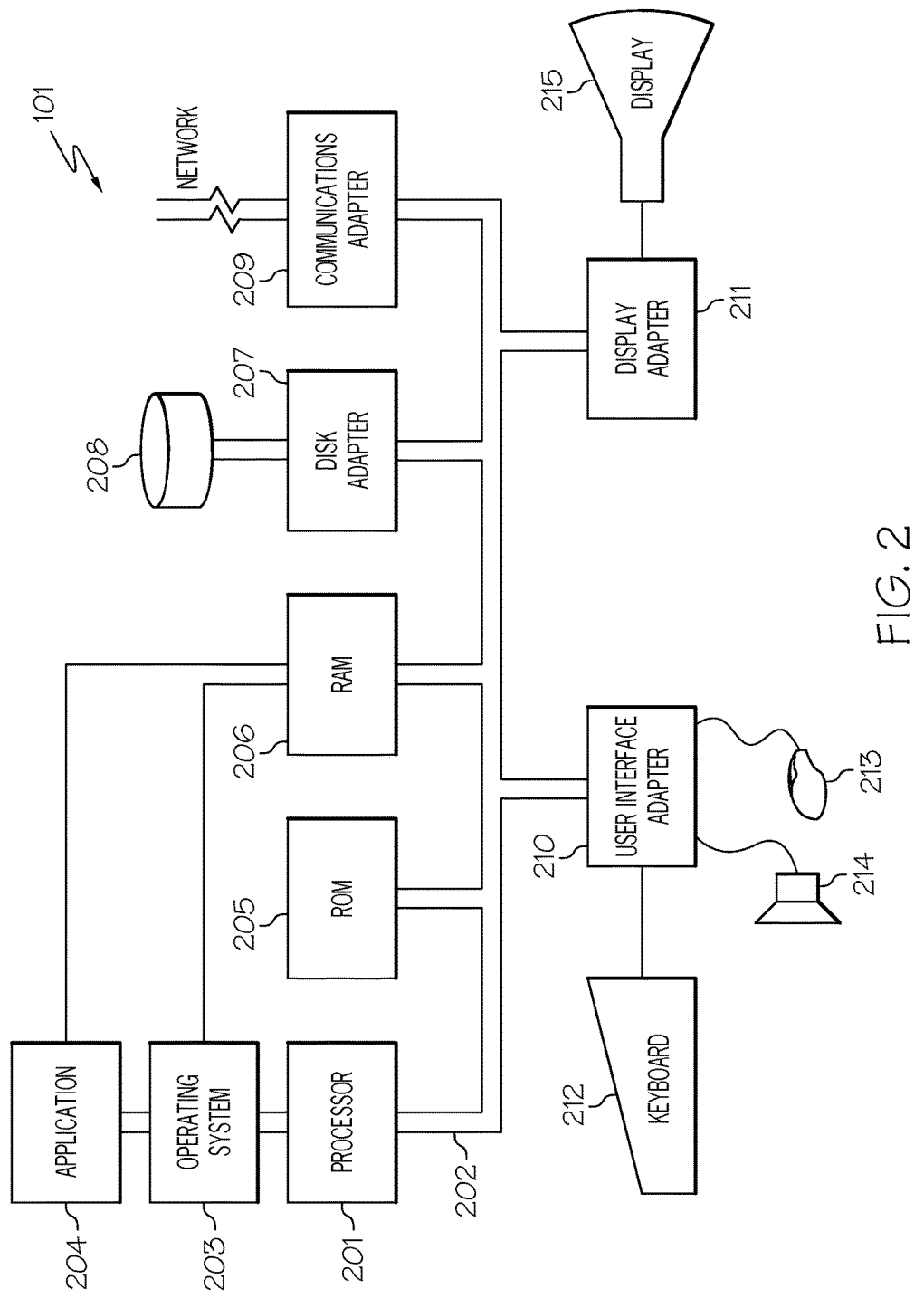
FIG. 2 illustrates a hardware configuration of a computing device for practicing the principles of the present invention in accordance with an embodiment of the present invention.

Referring now to FIG. 2, FIG. 2 illustrates a hardware configuration of a computing device 101 (FIG. 1) for practicing the principles of the present invention in accordance with an embodiment of the present invention.

As illustrated in FIG. 2, computing device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, an application for ensuring a desired distribution of images in a multimedia document among different demographic groups (e.g., males aged 21-30, males aged 31-40) as discussed below in association with FIGS. 3-5.

Referring again to FIG. 2, read-only memory ("ROM") 205 is coupled to system bus 202 and includes a basic input/output system ("BIOS") that controls certain basic functions of computing device 101. Random access memory ("RAM") 206 and disk adapter 207 are also coupled to system bus 202. It should be noted that software components including operating system 203 and application 204 may be loaded into RAM 206, which may be computing device's 101 main memory for execution. Disk adapter 207 may be an integrated drive electronics ("IDE") adapter that communicates with a disk unit 208, e.g., disk drive. It is noted that the program for ensuring a desired distribution of images in a multimedia document among different demographic groups (e.g., males aged 21-30, males aged 31-40), as discussed below in association with FIGS. 3-5, may reside in disk unit 208 or in application 204.

Computing device 101 may further include a communications adapter 209 coupled to bus 202. Communications adapter 209 interconnects bus 202 with an outside network (e.g., network 103 of FIG. 1) thereby enabling computing device 101 to communicate with other devices, such as database 102 (FIG. 1).

I/O devices may also be connected to computing device 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to computing device 101 through keyboard 212 or mouse 213 and receiving output from computing device 101 via display 215 or speaker 214.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, generating a multimedia document, such as a yearbook or slideshow, that includes a set of images that is representative of different demographic groups (e.g., a group of individuals in their 20s, a group of individuals in their 30s, etc.) within a large group of members (e.g., employees at a company) can be a difficult task. For example, it takes a lot of effort and time in creating an end of the year slideshow for an organization (e.g., company, non-profit organization) that includes pictures of members of the organization (e.g., employees of company). The creator(s) of the slideshow may want to ensure that each demographic group (e.g., groups based on age, race, gender) are not overly or inadequately represented in comparison to the other demographic groups in order to provide fairness and increase member enjoyment. For example, the creator(s) of the yearbook may want to ensure that the slideshow does not include many images of a particular demographic group (e.g., twenty pictures of males) while only including a single image of another class demographic group (e.g., a single picture of a female). However, the creator(s) of the slideshow may have hundreds or thousands of images of hundreds of members of the organization to choose to include in the slideshow. As a result, it may be overwhelming for the creator(s) of the slideshow to ensure that each member of the organization is adequately represented in the slideshow and that there are not some members that are overly represented in the yearbook. Therefore, there is a need in the art for ensuring a desired distribution of images for various demographic groups in a multimedia document (e.g., yearbook, slideshow, video, website).

Figure 3:
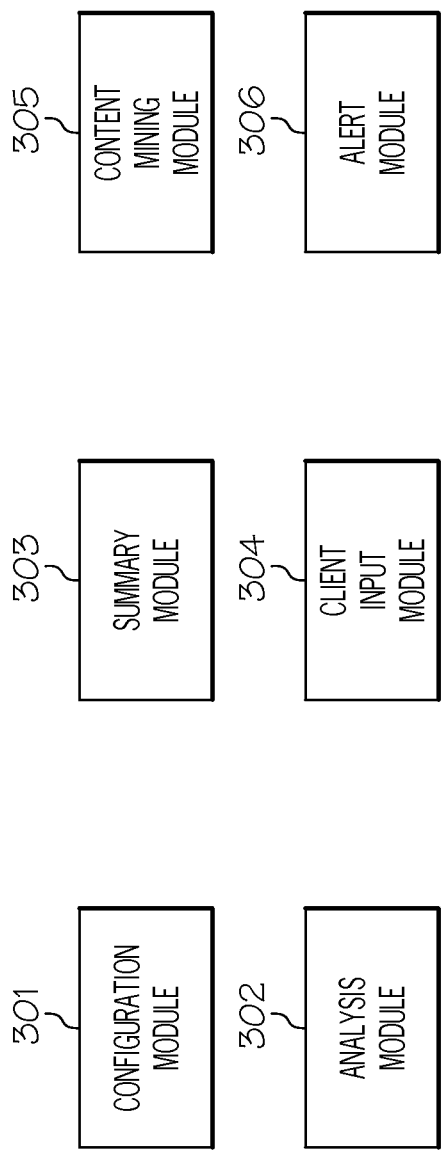
FIG. 3 is a diagram of the software components used in connection with ensuring a desired distribution of images in a multimedia document among different demographic groups in accordance with an embodiment of the present invention.
Figure 4:
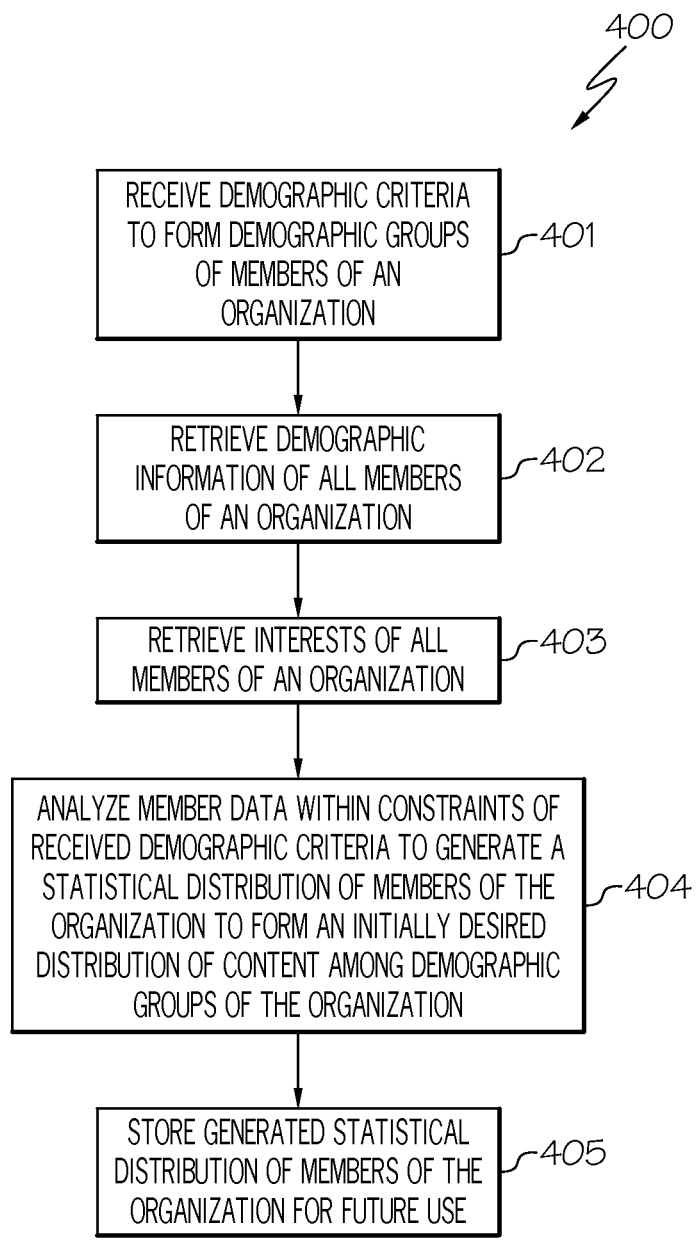
FIG. 4 is a flowchart of a method for generating a desired statistical distribution of images in the multimedia document among demographic groups of the organization in accordance with an embodiment of the present invention.
Figure 5:
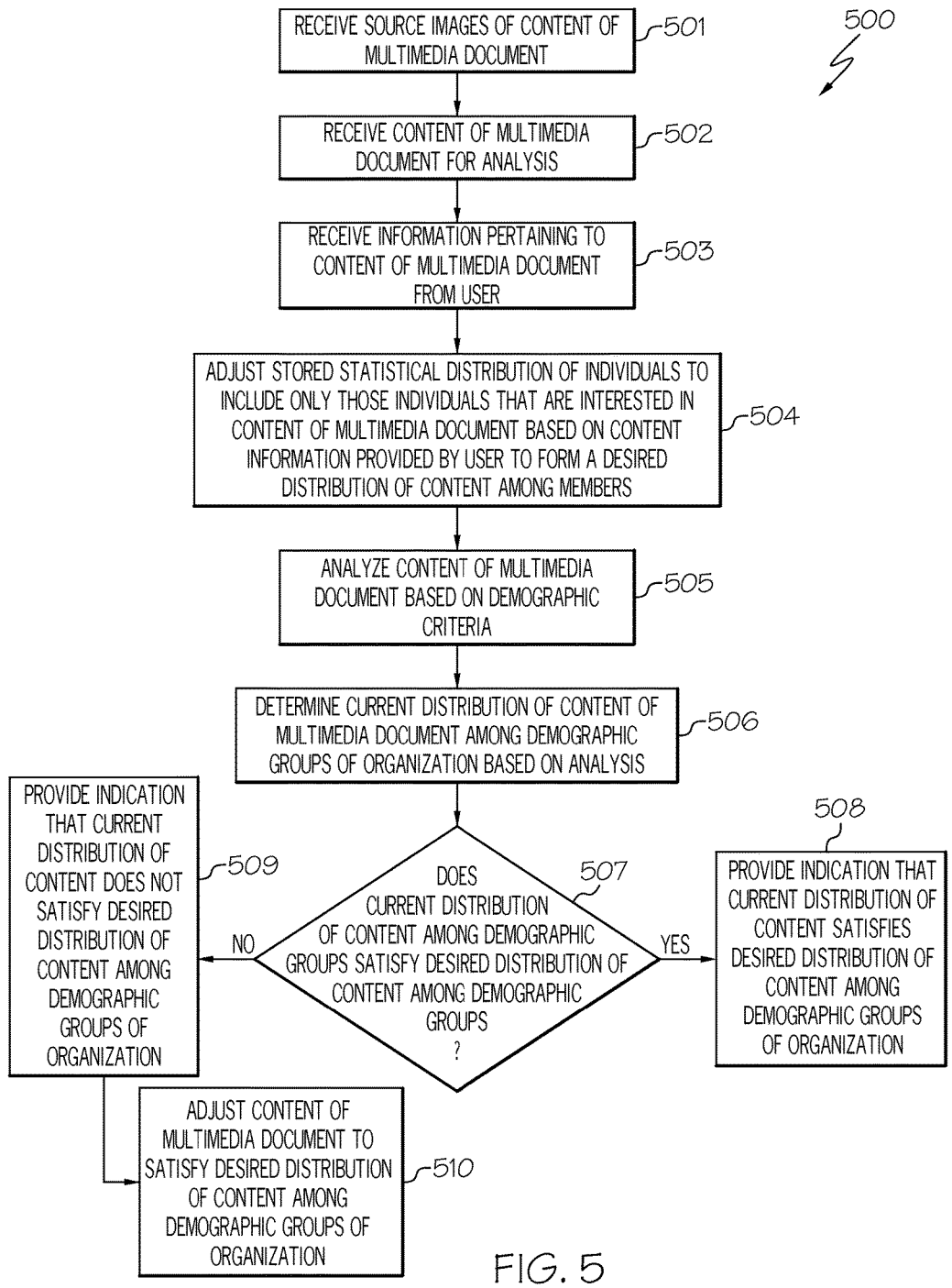
FIG. 5 is a flowchart of a method for ensuring a desired distribution of images in the multimedia document among different demographic groups of the organization in accordance with an embodiment of the present invention.

The principles of the present invention provide a means for ensuring a desired distribution of images in a multimedia document among different demographic groups as discussed below in connection with FIGS. 3-5. FIG. 3 is a diagram of the software components used in connection with ensuring a desired distribution of images in a multimedia document among different demographic groups. FIG. 4 is a flowchart of a method for generating a desired statistical distribution of images in the multimedia document among demographic groups of the organization. FIG. 5 is a flowchart of a method for ensuring a desired distribution of images in the multimedia document among different demographic groups of the organization.

As stated above, FIG. 3 is a diagram of the software components used in connection with ensuring a desired distribution of images in a multimedia document among different demographic groups in accordance with an embodiment of the present invention. In one embodiment, these software components may reside in application 204 (FIG. 2).

The following provides a brief description of these software components. A more detailed description of these software components is provided below in conjunction with FIGS. 4-5, where their functionalities are discussed below in connection with the methods of FIGS. 4 and 5.

Referring to FIG. 3, the software components include a configuration module 301 configured to form the demographic groups (e.g., members aged between 21-30 years old) of the organization using demographic criteria (e.g., age) provided by the user of computing device 101.

The software components further include an analysis module 302 configured to analyze demographic information and the interests of the members (e.g., employees) of an organization (e.g., non-profit organization, company) to generate a statistical distribution of members of the organization that forms the desired distribution of content among the demographic groups of the organization. For example, if the demographic criteria was to form demographic groups based on age, then a statistical distribution of members of the organization based on age may appear as follows: aged 11-20 (5%); aged 21-30 (20%); aged 31-40 (40%); aged 41-50 (20%); aged 51-60 (10%); aged 61 and older (5%), where the percentage indicates a percentage of the members of the organization with an age in that corresponding demographic group.

Furthermore, the software components include a summary module 303 configured to record and store the generated statistical distribution of members of the organization for future use.

Additionally, the software components include a content input module 304 configured to receive content of a multimedia document (e.g., yearbook, slideshow, video, website) for analysis. The software component of content mining module 305 analyzes the contents of the multimedia document based on the demographic criteria provided by the user to determine the current distribution of content of the multimedia document among the demographic groups of the organization.

Furthermore, the software components include an alert module 306 configured to provide an indication to the user of computing device 101 regarding whether the current distribution of content among the demographic groups of the organization satisfies the desired distribution of content among the demographic groups.

A more detailed description of the functionalities of these software components is provided below in connection with FIGS. 4-5.

As stated above, FIG. 4 is a flowchart of a method 400 for generating a desired statistical distribution of images in the multimedia document among demographic groups of the organization in accordance with an embodiment of the present invention.

Referring to FIG. 4, in conjunction with FIGS. 1-3, in step 401, configuration module 301 receives demographic criteria (e.g., age, race, gender, department, interest, religion, family classification (e.g., brother, son, parent, child, adult), etc.) to form groups (referred to herein as "demographic groups") of individuals or members within an organization (e.g., non-profit organization, company). For example, a user may input to computing device 101 one or more demographic criteria to be used to form demographic groups of members of an organization. For instance, the user may input the demographic criteria of age to be used to form demographic groups of members of an organization. As discussed further below, configuration module 301 may form demographic groups of members of the organization based on age, such as based on members being in their 20s, 30s, 40s, etc. Furthermore, the user may input multiple demographic criteria that may be used in combination to form demographic groups of members of the organization. For example, the user may input the demographic criteria of age and gender to be used to form demographic groups of members of an organization. As a result, a demographic group of females aged 11-20, a demographic group of males aged 11-20, a demographic group of females aged 21-30, a demographic group of males aged 21-30, etc. of those members of the organization that satisfy such criteria may be formed.

In step 402, configuration module 301 retrieves the demographic information (e.g., age, gender, race) of members of the organization. Such information may be retrieved from profiles of the members stored at the organization's data center, such as in a database (e.g., database 102)

In step 403, configuration module 301 retrieves the interests of members of the organization. In one embodiment, the interests of members of the organization may be stored in profiles, such as at the organization's data center, such as in a database (e.g., database 102). In another embodiment, configuration module 301 retrieves the interests of members of the organization via social networking sites, such as Facebook® and LinkedIn®.

In step 404, analysis module 302 analyzes the member data, such as the demographic information and interests retrieved in steps 402, 403), within the constraints of the demographic criteria received in step 401 to generate a statistical distribution of members of the organization to form an initially desired distribution of content (e.g., images, video, text, voice) of the multimedia document among the demographic groups of the organization. The initial desired distribution of content of the multimedia document may be adjusted as discussed further below in connection with step 504. For example, if the demographic criteria received in step 401 was to form demographic groups based on age, then a statistical distribution of members of the organization based on age may appear as follows: aged 11-20 (5%); aged 21-30 (20%); aged 31-40 (40%); aged 41-50 (20%); aged 51-60 (10%); aged 61 and older (5%), where the percentage indicates a percentage of the members of the organization with an age in that corresponding demographic group.

In another example, if the demographic criteria received in step 401 was to form demographic groups based on gender, then a statistical distribution of members of the organization based on age may appear as follows: male (65%) and female (35%), where the percentage indicates a percentage of the members of the organization with a gender in that corresponding demographic group.

In a further example, the user may provide multiple demographic criteria in step 401 to form demographic groups of members within the organization. For example, the user may indicate to use both age and gender as criteria for forming demographic groups of members within the organization. As a result, a statistical distribution of members of the organization based on age and gender may appear as follows: female aged 11-20 (5%); male aged 11-20 (10%); female aged 21-30 (10%); male aged 21-30 (15%); female aged 31-40 (10%); male aged 31-40 (20%); female aged 41-50 (5%); male aged 41-50 (10%); female aged 51-60 (3%); male aged 51-60 (6%); female aged 61 and older (2%); male aged 61 and older (4%), where the percentage indicates a percentage of the members of the organization with an age and gender in that corresponding demographic group.

In step 405, summary module 303 stores the statistical distribution of members of the organization generated in step 404, such as in database 101, for future use.

As discussed above, the statistical distribution of members of the organization generated in step 404 forms the desired distribution of content (e.g., images, video, text, voice) of the multimedia document among the demographic groups of the organization as discussed below in connection with FIG. 5.

FIG. 5 is a flowchart of a method 500 for ensuring a desired distribution of images in the multimedia document among different demographic groups of the organization in accordance with an embodiment of the present invention.

Referring to FIG. 5, in conjunction with FIGS. 1-4, in step 501, content input module 304 receives the source images of the content of the multimedia document. These source images may provide the source of the content (e.g., pictures, weekly newspapers for the past six months) that was used by the user to create the multimedia document (e.g., yearbook, slideshow, video, website) that will be analyzed in step 505 as discussed below. Furthermore, these source images may include additional images that were not utilized by the user to create the multimedia document.

In step 502, content input module 304 receives the content of the multimedia document (e.g., yearbook, slideshow, video, website) created by the user for analysis.

In step 503, content input module 304 receives information pertaining to the content of the multimedia document from the user. For example, the user may indicate that the content (slides of a slideshow) pertains to football since the slideshow is a presentation of pictures taken at the Super Bowl party. Such information may be used by content input module 304 to adjust the stored statistical distribution of members of the organization generated in step 404 that formed the desired distribution of content (e.g., images, video, text, voice) of the multimedia document among the demographic groups of the organization.

In step 504, content input module 304 optionally adjusts the stored statistical distribution of members (generated in step 404) that form the desired distribution of content of the multimedia document among the demographic groups of the organization based on the received content information. For example, suppose that the demographic criteria received in step 401 was to form demographic groups based on gender and a statistical distribution of members of the organization based on age was generated as follows: male (65%) and female (35%), where the percentage indicates a percentage of the members of the organization with a gender in that corresponding demographic group. Based on the analysis of the member's interest in step 404, content input module 304 may determine that out of the 1,000 employees, 700 of them are interested in football. Out of these 700 employees, computing device 101 determines that 80% of them are male and 20% of them are female based on gender information that may be obtained from their profile. As a result, the desired distribution of content of the multimedia document among the demographic groups of the organization may be modified to be male (80%) and female (20%). That is, the stored statistical distribution of members (generated in step 404) that form the desired distribution of content of the multimedia document among the demographic groups of the organization is modified based on the received content information. The modified statistical distribution of members may be stored in database 102.

In step 505, content mining module 305 analyzes the content of the multimedia document based on the demographic criteria received in step 401. For example, if the demographic criteria received in step 401 was to form demographic groups based on gender, then computing device 101 analyzes the content (e.g., pictures) for images of individual based on gender. In one embodiment, computing device 101 utilizes a face recognition algorithm that can determine a gender with a certain probability based on features of the shape of the face (males tend to have square-shaped faces with more intricate hairlines and slightly square jawlines as well as have longer faces at the bottom to accommodate a longer upper lip and lengthy chin), facial features (e.g., females' eyebrows are more arched and sit higher above the rims of the eyes, while males' eyebrows sit slightly above the brow bone) and bone structure (e.g., brow bossing is more pronounced in men, women tend to have foreheads that are more rounded and vertical, women tend to have higher cheekbones than men do, men tend to have hollower cheeks).

In another example, if the demographic criteria received in step 401 was to form demographic groups based on age, then computing device 101 analyzes the content (e.g., pictures) for images of individual based on age. For example, an age may be estimated using a face recognition algorithm by analyzing each section of the person's cheek, eye, brow, mouth and jowl looking for shading variations that signal lines, dark spots, drooping and other age-related changes in comparison with a known sample of images of individuals with a known age. In one embodiment, dot "landmarks" may be placed on the image to determine a target area. The dots are connected to make triangles where computing device 101 looks for variations in color and texture within each triangle. More variation than average within an area often indicates an older face. Major regions are considered and assigned ages. The combination results in a "perceived age." Such major regions may include the forehead where horizontal creases and lines around the brow ridge may indicate age (more horizontal creases and lines the older the individual may be). Another major region is the brow region where vertical lines appear between the eyebrows in people who tend to furrow them (vertical lines may be used to indicate age). Another major region is the area around the eyes where crow's feet and bags below the eye can begin to appear in the mid-20s. Furthermore, a major region may be the nose area where the tip of the nose becomes more bulbous with age. The cheek/jowl area may be another major region where cheeks may start to sag with age and the wrinkles develop in the cheeks with age. The mouth may also be another major region where collagen declines making the lips thinner with age and the mouth begins to drop at the corners with age.

Other examples include estimating a person's ethnicity using facial recognition software that utilizes ethnicity-sensitive image features and probabilistic graphical models to represent ethnic classes. The ethnicity sensitive image features are derived from groups of image features so that each grouping of the image features contributes to more accurate recognition of the ethnic class. The ethnicity-sensitive image features can be derived from image filters that are matched to different colors, sizes, and shapes of facial features, such as eyes, mouth, or complexion. The ethnicity-sensitive image features serve as observable quantities in the ethnic class-dependent probabilistic graphical models, where each probabilistic graphical model represents one ethnic class. A given input facial image is corrected for pose and lighting, and ethnicity-sensitive image features are extracted. The extracted image features are fed to the ethnicity-dependent probabilistic graphical models to determine the ethnic class of the input facial image.

In step 506, content mining module 305 determines the current distribution of the content of the multimedia document among the demographic groups (demographic groups formed in light of the demographic criteria received in step 401) of the organization based on the analysis of step 505. For example, content mining module 305 may determine that out of the 1,000 images analyzed, 700 of them were pictures of males and 300 of them were pictures of females.

In step 507, a determination is made by content mining module 305 as to whether the current distribution of content among the demographic groups (demographic groups formed in light of the demographic criteria received in step 401) of the organization satisfies the desired distribution of content among the demographic groups. For example, content mining module 305 may determine that out of the 100 slides of the slideshow, 70 slides depicted men and 30 slides depicted women. Such a content distribution (70 slides of men and 30 slides) may be compared to the desired distribution of content among the demographics groups of the organization, such as a statistical distribution of members of the organization based on age: male (65%) and female (35%). In such an example, the current distribution of content among the demographic groups of the organization does not satisfy the desired distribution of content among the demographic groups since 70% of the slides depict men as opposed to 65% and only 30% of the slides depict females as opposed to 35%. If, however, the content distribution of the slides of the slideshow were 65 slides depicting men and 35 slides depicting women, then the current distribution of content among the demographic groups of the organization may be said to satisfy the desired distribution of content among the demographic groups.

If the current distribution of content among the demographic groups (demographic groups formed in light of the demographic criteria received in step 401) of the organization satisfy the desired distribution of content among the demographic groups, then, in step 508, alert module 306 provides an indication (e.g., textual notification) that the current distribution of content satisfies the desired distribution of content among the demographic groups of the organization.

If, however, the current distribution of content among the demographic groups (demographic groups formed in light of the demographic criteria received in step 401) of the organization does not satisfy the desired distribution of content among the demographic groups, then, in step 509, alert module 306 provides an indication (e.g., textual notification) that the current distribution of content does not satisfy the desired distribution of content among the demographic groups of the organization.

In step 510, content mining module 305 adjusts the content of the multimedia document to satisfy the desired distribution of content among the demographic groups of the organization. For example, content mining module 305 may provide images to the user from the source images of the content of the multimedia document (received in step 501) to be added to the multimedia document to adjust the content of the multimedia document for a particular demographic group to satisfy the desired distribution of content for that demographic group of the organization when the current distribution of content for that demographic group does not satisfy the desired distribution of content for that demographic group. For instance, if the current distribution of slides in the slideshow includes 30 slides of women out of a total of 100 slides and the desired distribution of slides that include females is 35%, then content mining module 305 may provide additional images of females (e.g., five images) from the source images that have not been included in the multimedia document to the user to be added to the multimedia document to increase the number of slides depicting females. In one embodiment, content mining module 305 may utilize a facial recognition algorithm to identify appropriate images (e.g., images of females) from the source images to be added to the multimedia document.

In conjunction with providing images to be added to the multimedia document, content mining module 305 may provide images from the multimedia document to be deleted from the multimedia document to adjust the content of the multimedia document for a particular demographic group to satisfy the desired distribution of content for that demographic group of the organization when the current distribution of content for that demographic group does not satisfy the desired distribution of content for that demographic group. For instance, if the current distribution of slides in the slideshow include 70 slides of men out of a total of 100 slides and the desired distribution of slides that include males is 65%, then computing device 101 may provide images of males (e.g., five images) from the multimedia document to be deleted from the multimedia document to reduce the number of slides depicting males. In one embodiment, content mining module 305 may utilize a facial recognition algorithm to identify appropriate images (e.g., images of males) from the multimedia document to be deleted from the multimedia document.

In this manner, the user can ensure a desired distribution of content in the multimedia document (e.g., yearbook, slideshow, video, website) among different demographic groups.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for ensuring a desired distribution of images in a multimedia document among different demographic groups, the method comprising:
receiving demographic criteria to form demographic groups of members of an organization;
retrieving demographic information of said members of said organization;
retrieving interests of said members of said organization;
analyzing said demographic information and said interests of said members of said organization within constraints of said demographic criteria to generate a statistical distribution of members to form a desired distribution of content of said multimedia document among said demographic groups of said organization, wherein said multimedia document comprises one of the following: a yearbook, a slideshow, a video and a website;
receiving content of said multimedia document for analysis;
analyzing said content of said multimedia document based on said demographic criteria;
determining, by a processor, a current distribution of said content of said multimedia document among said demographic groups of said organization based on said analysis;
providing an indication that said current distribution of said content of said multimedia document among said demographic groups of said organization satisfies or does not satisfy said desired distribution of content among said demographic groups of said organization; and
adjusting said content of said multimedia document by adding or deleting images to satisfy said desired distribution of content among said demographic groups of said organization in response to said current distribution of said content of said multimedia document among said demographic groups of said organization not satisfying said desired distribution of content among said demographic groups of said organization.

2. The method as recited in claim 1 further comprising:
receiving source images of said content of said multimedia document.

3. The method as recited in claim 2 further comprising:
providing images from said source images of said content of said multimedia document to be added to said multimedia document to adjust said content of said multimedia document to satisfy said desired distribution of content among said demographic groups of said organization.

4. The method as recited in claim 1 further comprising:
providing images from said content of said multimedia document to be deleted from said multimedia document to adjust said content of said multimedia document to satisfy said desired distribution of content among said demographic groups of said organization.

5. The method as recited in claim 1 further comprising:
storing said generated statistical distribution of members that form said desired distribution of content of said multimedia document among said demographic groups of said organization.

6. The method as recited in claim 5 further comprising:
receiving information pertaining to said content of said multimedia document; and
adjusting said stored statistical distribution of members that form said desired distribution of content of said multimedia document among said demographic groups of said organization based on said received content information.

7. The method as recited in claim 1, wherein said analysis of said content of said multimedia document based on said demographic criteria utilizes a facial recognition algorithm.

8. The method as recited in claim 1, wherein said demographic criteria comprises one or more of the following: age, race, gender, department, interest, religion and family classification.

* * * * *